(12) United States Patent
Petzitillo, Jr. et al.

(10) Patent No.: US 10,538,188 B2
(45) Date of Patent: Jan. 21, 2020

(54) APPARATUS AND METHOD FOR REMOTELY LOCKING A CONTAINER

(71) Applicant: Wastequip, LLC, Charlotte, NC (US)

(72) Inventors: Anthony D. Petzitillo, Jr., Sicklerville, NJ (US); Todd A. Fowler, Sewell, NJ (US)

(73) Assignee: Wastequip LLC, Charlotte, NC (US)

( * ) Notice: Subject to any disclaimer, the term of this patent is extended or adjusted under 35 U.S.C. 154(b) by 200 days.

(21) Appl. No.: 15/613,765

(22) Filed: Jun. 5, 2017

(65) Prior Publication Data

US 2017/0267148 A1 Sep. 21, 2017

Related U.S. Application Data

(60) Continuation of application No. 14/657,423, filed on Mar. 13, 2015, now Pat. No. 9,669,748, which is a division of application No. 14/298,279, filed on Jun. 6, 2014, now Pat. No. 9,039,097, which is a continuation of application No. 13/950,141, filed on Jul. 24, 2013, now Pat. No. 8,746,085, which is a continuation of application No. 13/647,870, filed on Oct. 9, 2012, now abandoned, which is a continuation of application No. 12/709,231, filed on Feb. 19, 2010, now abandoned.

(60) Provisional application No. 61/153,969, filed on Feb. 19, 2009.

(51) Int. Cl.
*B60P 1/16* (2006.01)
*B60P 1/273* (2006.01)
*B60P 1/26* (2006.01)

(52) U.S. Cl.
CPC .............. *B60P 1/273* (2013.01); *B60P 1/16* (2013.01); *B60P 1/26* (2013.01)

(58) Field of Classification Search
CPC .... B60P 1/273; B60P 1/16; B60P 1/26; E05C 3/06
USPC .......... 298/17 R, 22 R, 23 M, 23 A; 296/56; 292/267, 274, 298
See application file for complete search history.

(56) References Cited

U.S. PATENT DOCUMENTS

| | | |
|---|---|---|
| 5,823,630 A | 10/1998 | Graham |
| 6,186,563 B1 | 2/2001 | Kruzick |
| 6,698,842 B1 | 3/2004 | Cornell et al. |
| 7,591,513 B2 * | 9/2009 | Morley ................... B60P 1/26 298/23 MD |
| 8,746,805 B1 | 6/2014 | Petzitillo, Jr. et al. |

(Continued)

*Primary Examiner* — Stephen T Gordon
(74) *Attorney, Agent, or Firm* — Nelson Mullins Riley & Scarborough LLP (57) ABSTRACT

A system including a container having a door pivotably coupled to the container that is movable between a first position and a second position. A locking assembly is coupled with the container and includes a first shaft and a second shaft generally parallel with and spaced apart from the first shaft, and an over center linkage extending between a respective first pivotal connection between the over center linkage and the first shaft and a respective second pivotal connection between the over center linkage and the second shaft. Further, the locking assembly includes at least one latch coupled with the second shaft and movable between an unlatched position and a latched position. The over center linkage is movable, when the door is at the second position, over center to a state at which the latch is in the latched position and the door is biased toward the second position.

19 Claims, 9 Drawing Sheets

(56) References Cited

U.S. PATENT DOCUMENTS 9,039,097 B2 5/2015 Petzitillo, Jr. et al.
9,669,748 B2 6/2017 Petzitillo, Jr. et al.

* cited by examiner

APPARATUS AND METHOD FOR REMOTELY LOCKING A CONTAINER

CROSS-REFERENCE TO RELATED APPLICATIONS

This application is a continuation application under 35 U.S.C. § 120 of U.S. patent application Ser. No. 14/657,423, filed Mar. 13, 2015, now U.S. Patent Application Publication No. 2015/0183357, which is a divisional application under 35 U.S.C. § 121 of U.S. patent application Ser. No. 14/298,279, filed Jun. 6, 2014, now U.S. Pat. No. 9,039,097, which issued on May 26, 2015, which is a continuation application under 35 U.S.C. § 120 of U.S. patent application Ser. No. 13/950,141, filed Jul. 24, 2013, now U.S. Pat. No. 8,746,805, which issued on Jun. 10, 2014, which is a continuation application under 35 U.S.C. § 120 of U.S. patent application Ser. No. 13/647,870, filed Oct. 9, 2012, now abandoned, which is a continuation application under 35 U.S.C. § 120 of U.S. patent application Ser. No. 12/709,231, filed Feb. 19, 2010, now abandoned, which claims the benefit under 35 U.S.C. § 119 (e) of U.S. Provisional Patent Application No. 61/153,969, filed Feb. 19, 2009, the entire disclosures of which are incorporated by reference herein.

FIELD OF THE INVENTION

The present invention relates to the field of transportable containers, and more specifically, to an apparatus and method for remotely locking and unlocking a container adapted for transport upon one or more vehicles.

BACKGROUND OF THE INVENTION

Bulk materials, hazardous waste materials and other such materials are frequently transported to their destinations in very large waste handling containers. It is important that the door, often a rear, one piece door hingedly mounted at the top, maintain a fluid-tight seal against the container body to prevent the flowable materials from escaping during transport. The door sealing mechanisms can be difficult to operate, and the vehicle driver may have to latch, unlatch or adjust the door locking mechanisms in inclement weather. It is therefore desirable to provide a door locking mechanism for such containers that reduces the need for the driver to leave the vehicle cab, especially during container dumping action.

Oftentimes, the above described containers are desired to be intermodal. That is, it is desired that they be capable of being transported by a number of different vehicles, such as, for example, a truck, a train or a ship. The locking mechanism should accommodate all such forms of transport.

What is desired is a waste and material hauling container having a rear-mounted dump door with a remotely operable locking mechanism.

SUMMARY OF THE INVENTION

According to one embodiment, the present invention comprises a system comprising a container. The container has at least one open end and a door pivotably coupled to the container so that the door is movable between a first position, at which the door is spaced from the at least one open end, and a second position, at which the door closes the at least one open end. A locking assembly is coupled with the container and comprises a first shaft and a second shaft generally parallel with and spaced apart from the first shaft. The locking assembly also includes at least one over center linkage extending between a respective first pivotal connection between the at least one over center linkage and the first shaft and a respective second pivotal connection between the at least one over center linkage and the second shaft. Further, the locking assembly includes at least one latch coupled with the second shaft and movable between an unlatched position, wherein the at least one latch is spaced from the door, and a latched position, wherein the latch applies a closing force to the door. The at least one over center linkage is movable, when the door is at the second position, over center to a state at which the latch is in the latched position and the door is biased toward the second position.

In yet another embodiment, the present invention comprises a system comprising a container having at least one open end. A door is coupled to the container so that the door is movable between a first position, at which the door is spaced from the at least one open end, and a second position, at which the door closes the at least one open end. A locking assembly is coupled with the container, and the locking assembly comprises a first rotatable member, a second rotatable member, and a linkage assembly coupled between the first rotatable member and the second rotatable member. The linkage assembly has a first arm coupled to the first rotatable member, a second arm coupled to the second rotatable member, and a third arm coupled between the first and second arms at respective first and second pivot points. The locking assembly also comprises a latch coupled with the second rotatable member and movable between an unlatched position, wherein the at least one latch is spaced from the door, and a latched position, wherein the latch applies a closing force to the door. When the door is in the second position, a line passes through the second pivot point and the coupling between the first arm and the first rotatable member. When the first pivot point has rotated from a first side of the line to a second side of the line, the first pivot point is biased away from the first line, and the latch is in the latched position.

According to a further embodiment, the present invention comprises a system comprising a container having at least one open end and a door pivotably coupled to the container so that the door is movable between a first position, at which the door is spaced from the at least one open end, and a second position, at which the door closes the at least one open end. The system also comprises a locking assembly coupled with the container. The locking assembly comprises a first member, a second member, and a linkage assembly coupled between the first member and the second member. The linkage assembly has a first end coupled to the first member, a second end coupled to the second member, and at least one pivot point intermediate the first and second ends of the linkage assembly. The locking assembly also comprises a latch coupled with the second member and movable between an unlatched position, wherein the at least one latch is spaced from the door, and a latched position, wherein the latch applies a closing force to the door. When the at least one pivot point rotates to a point above the coupling of the linkage assembly first end and the first member, the door is in the second position, and wherein the door is released from the second position when the at least one pivot point is rotated below the coupling of the linkage assembly first end and the first member.

Further objects and advantages of the present invention will become apparent from the following description of the preferred embodiment.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated herein are contemplated as would normally occur to one skilled in the art to which the invention relates.

Figure 1:
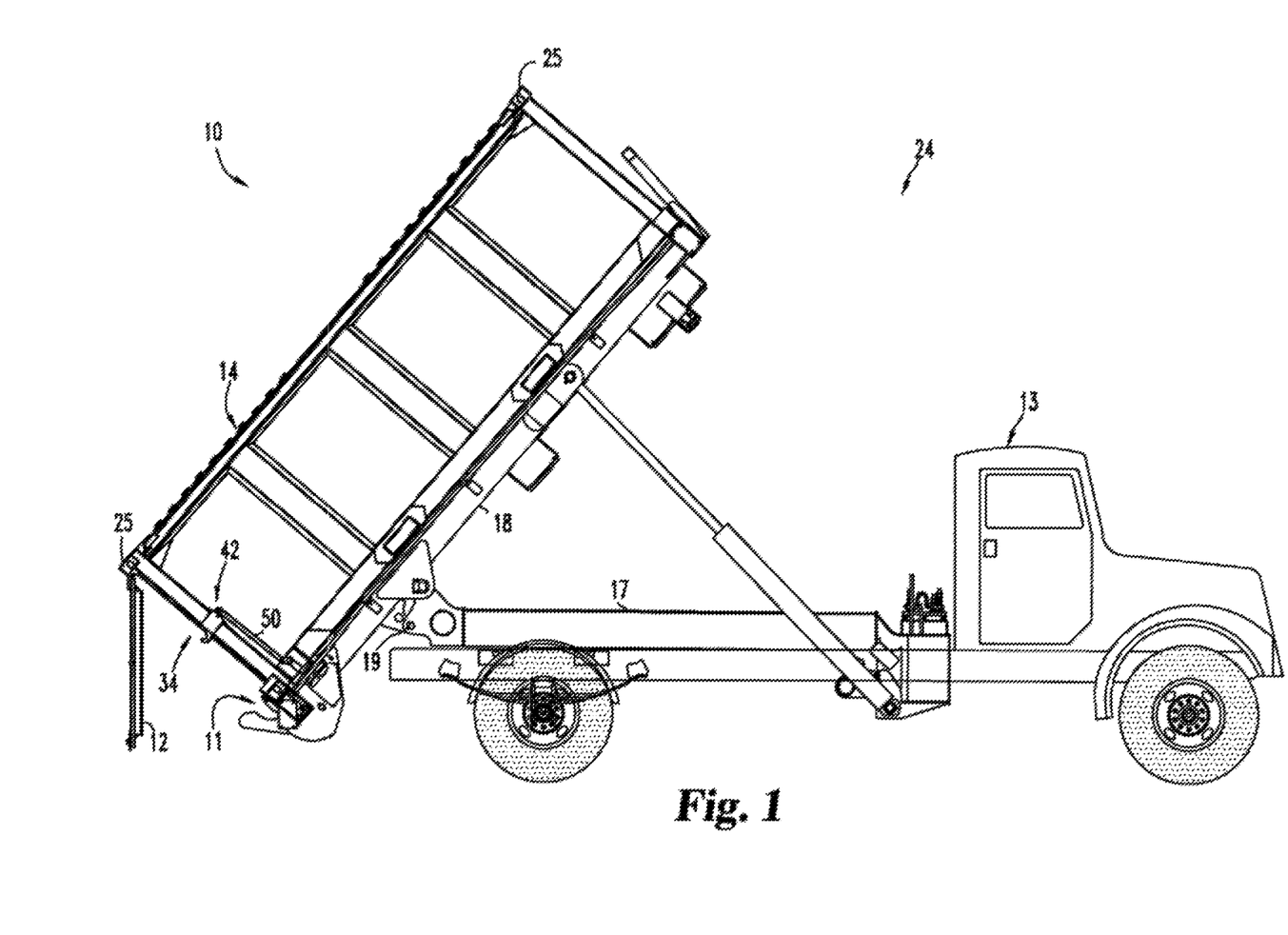
FIG. 1 is a side, elevational view of a container and vehicle combination 10 with apparatus 11 for remotely locking and unlocking the container door 12, in accordance with the present invention, and with elements removed from the vehicle 13 for clarity.

Referring to FIG. 1 there is shown a container and vehicle combination 10 with apparatus 11 for remotely locking and unlocking the container door 12, in accordance with the present invention. Combination 10 generally includes a vehicle 13 and a container 14, the container's dump door 12 being rear-mounted, and the apparatus 11 being remotely operable to lock and unlock door 12 in fluid tight engagement with its container 14.

The vehicle is a suitable container hoist having a main frame 17 and a tipper frame 18 hingedly connected to main frame 17 at hinge 19. Suitable hydraulic cylinders (one shown at 20) connected between main frame 17 and tipper frame 18 and with the hydraulic system of vehicle 13 are operable to pivot tipper frame 18 between a reclined, container loading and transport position 23 (FIGS. 4-7) and an inclined, dumping position 24 (FIG. 1), as is known. Vehicle 13 is configured to receive and handle intermodal containers, that is, containers of a specific size and having corner blocks 25 at each of its eight corners to enable such container to be stacked for transport aboard other vessels, such as trains and ships. Alternative embodiments are contemplated wherein the container 14 is of other, non-intermodal configurations, and the apparatus 11 will nevertheless operate to remotely lock and unlock the container aboard a properly equipped vehicle.

Figure 2:
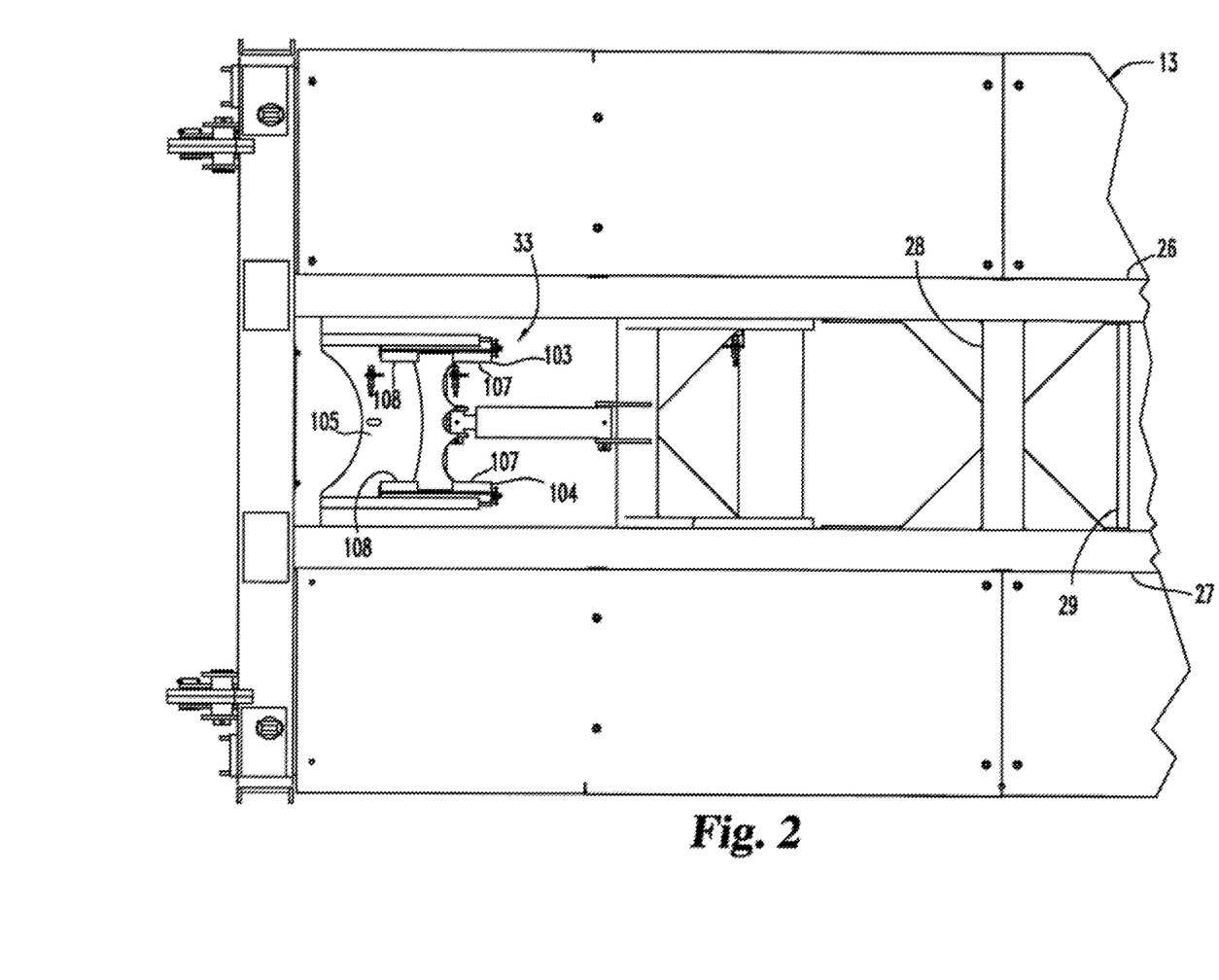
FIG. 2 is a fragmented plan view of the rear portion of vehicle 13 of the container and vehicle combination 10 of FIG. 1.

Referring to FIG. 2, vehicle 13 includes long rails 26 and 27, numerous transverse cross-members, as at 28 and 29, extending between long rails 26 and 27, bolsters (one shown at 30, FIG. 8) connected to the rear ends of and outwardly of long rails 26 and 27, and the actuator assembly 33 of apparatus 11, as described herein. Container 14 is configured to be loaded upon vehicle 13, resting primarily upon long rails 26 and 27 and bolster 30, and with the locking assembly 95 of apparatus 11 (as described herein) positioned directly above actuator assembly 33 for operative engagement therewith.

Figure 3:
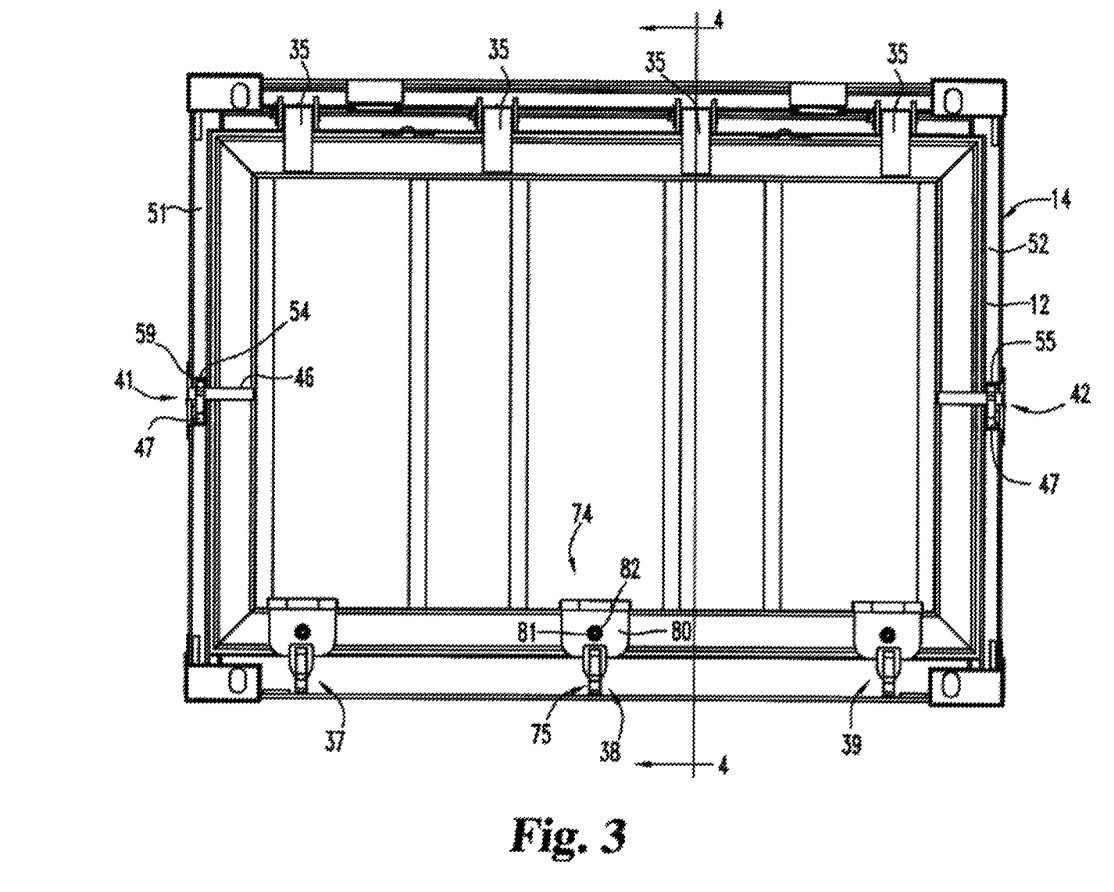
FIG. 3 is a rear, elevational view of container 14 of the container and vehicle combination 10 of FIG. 1 and shown in the locking position.
Figure 4:
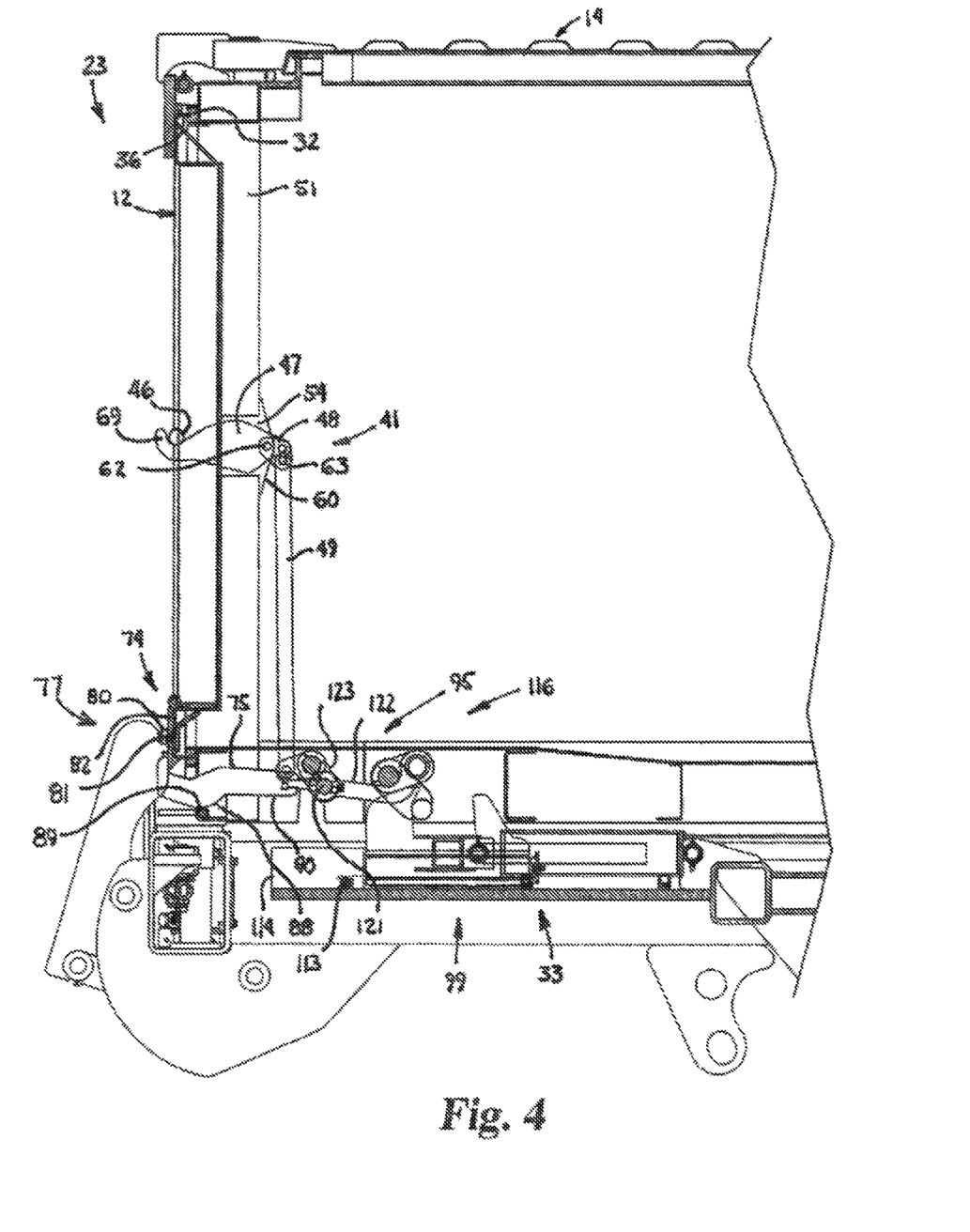
FIGS. 4-7 are side, cross-sectional views of the container 14 of FIG. 3 taken along the line 4-4 and viewed in the direction of the arrows and shown mounted upon vehicle 13 with locking assembly 95 in various stages of engagement with actuator assembly 33 and with certain parts removed or revealed for purposes of description.
Figure 5:
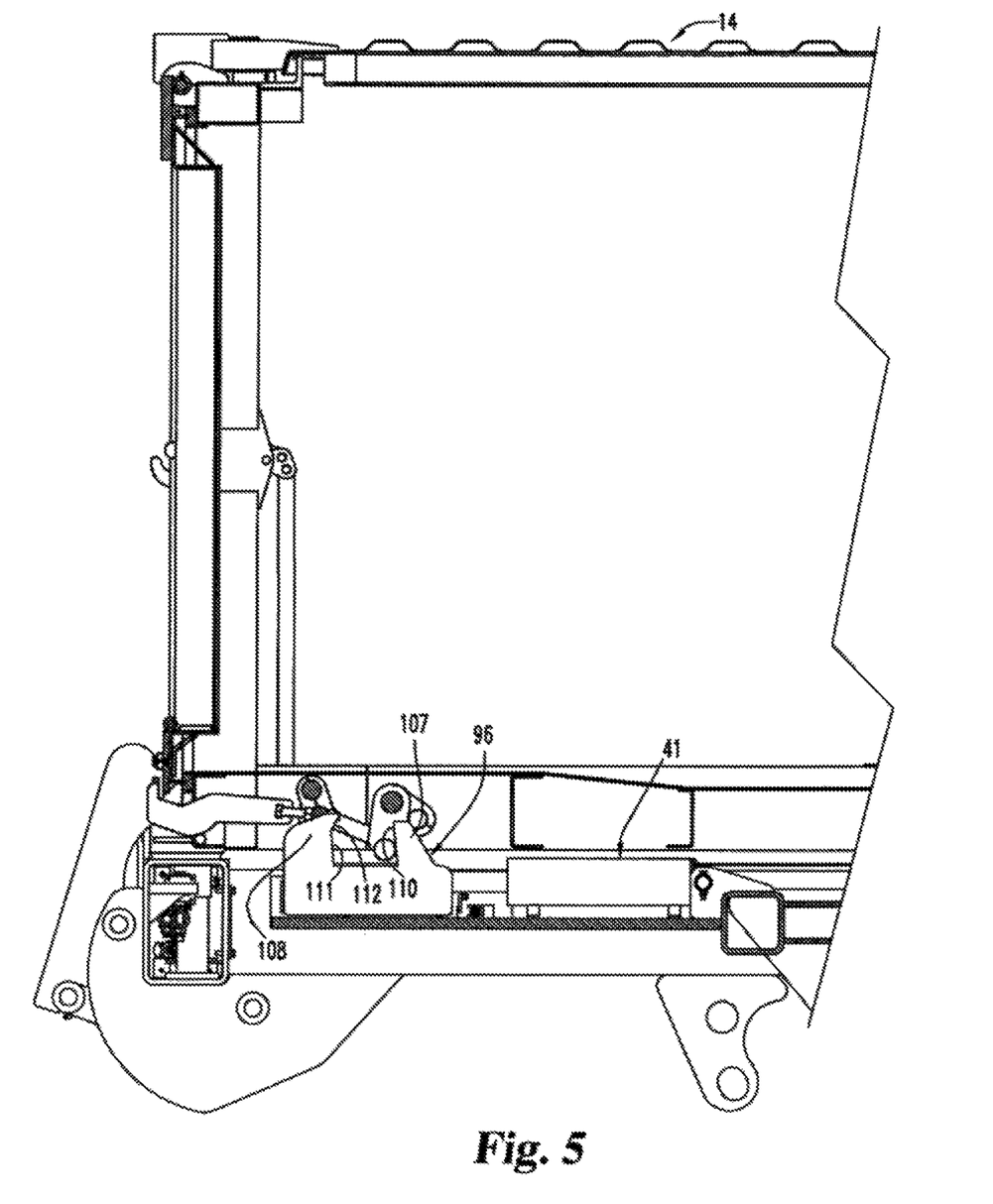
Figure 6:
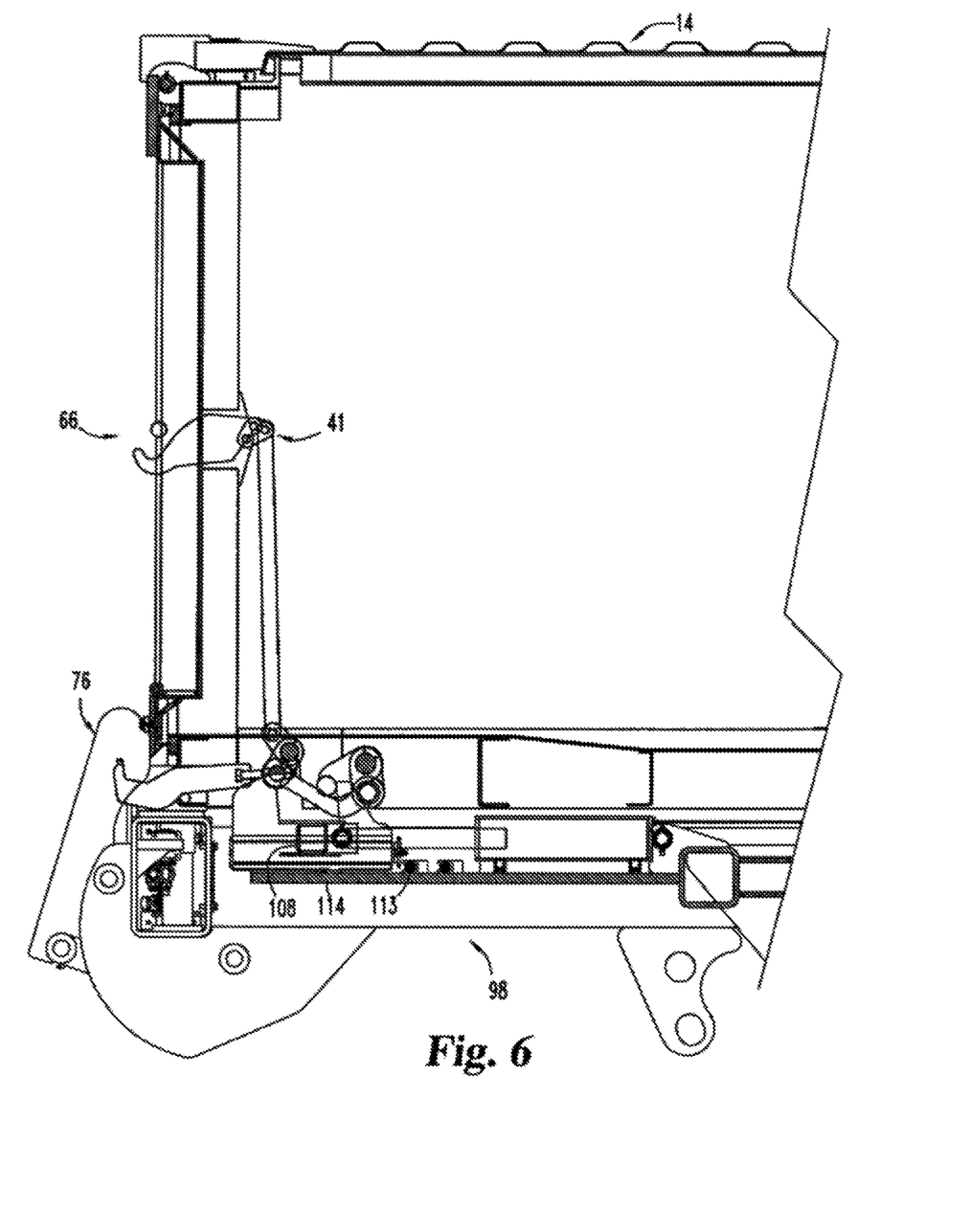
Figure 7:
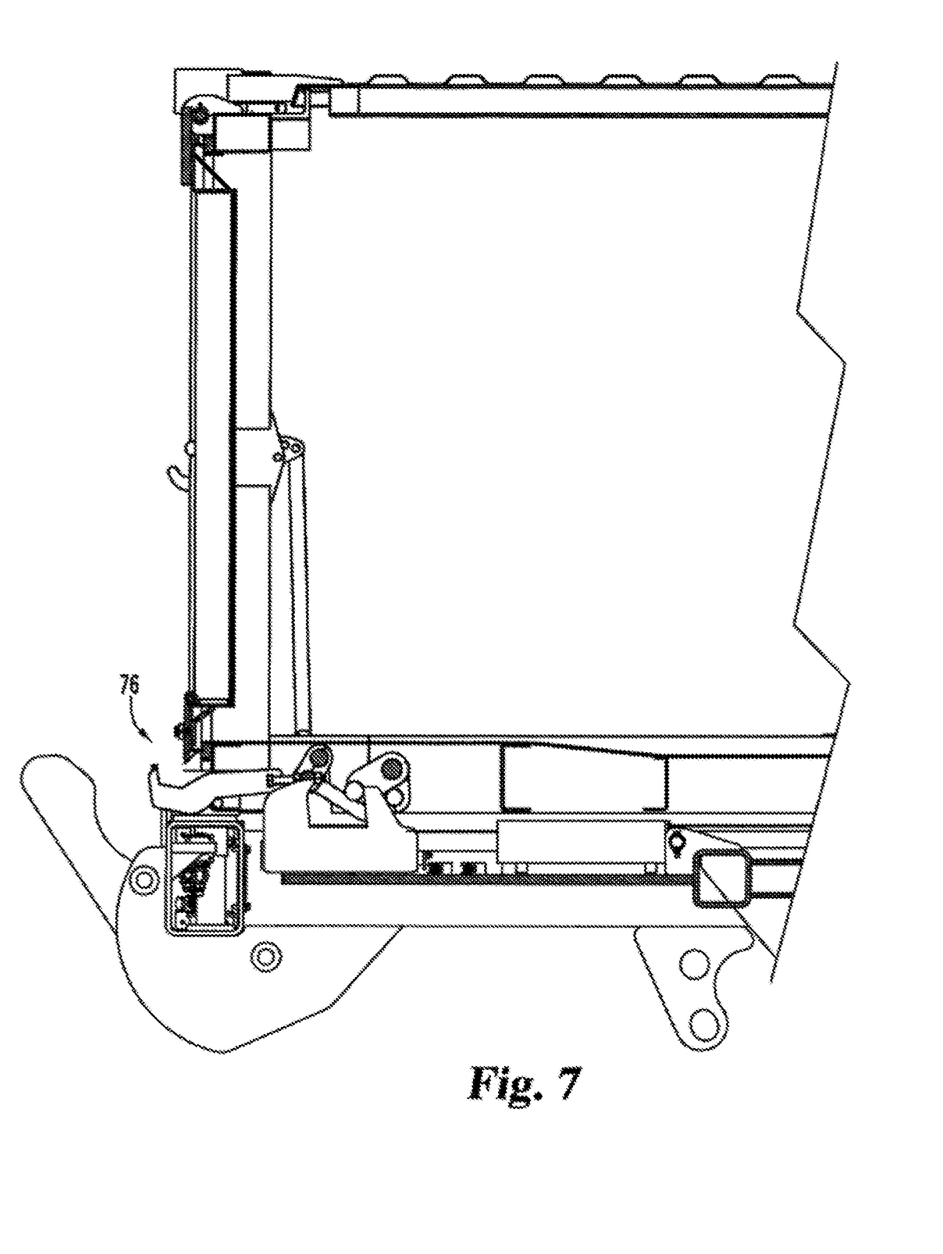

Referring to FIGS. 1 and 3, container 14 is a rectangular box container with a rear opening 34 and with its rear door 12 being hingedly mounted at the top edge thereof by hinges 35 to enable door 12 to swing open of its own accord by gravity when the locks holding it are released and tipper frame 18 is pivoted to the inclined, dumping position 24, as shown in FIG. 1. Container 14 includes a seal 32 (FIG. 4) held around the periphery of door opening 34, and door 12 includes a sealing ridge 36 extending forwardly and into seal 32 when door 12 is drawn in to its closed position (FIG. 4). Container 14 is provided with both bottom and side lock mechanism 37, 38 and 39 (bottom) and 41 and 42 (side). Bottom lock mechanisms 37, 38 and 39 are mutually identical, and only lock mechanism 38 will be fully described. Likewise, side mechanisms 41 and 42 are identical, albeit mirror images of each other, and only lock mechanism 41 will be fully described.

Referring to FIGS. 3 and 4, side lock mechanism 41 includes an outwardly extending door pull pin 46, a pull pin hook 47, a rocker link 48 and a bar link 49. Door pull pin 46 is rigidly connected to and extends laterally outwardly of door 12. At its rear, container 13 includes two, opposing vertical box tubing members 51 and 52, each of which defines an opening 54 and 55, respectively, through which freely extends a corresponding door pull pin hook 47 and 56, respectively. On opposing sides of tubing member 51 are mounted matching arrow plates 59 and 60, which together close off the sides of opening 54. Arrow plates 59 and 60 define aligned holes for receiving a pin 61, about which is rotatably mounted triangular rocker link 48, as shown. Rocker link 48 has three triangularly spaced mounting points, the second being at 62 where it is rotatably mounted to the forward end of door pull pin hook 47, and the third being at 63 where it is rotatably mounted to the upper end of bar link 49. The lower end of bar link 49 is pivotally connected to output pin 65 of locking assembly 95, as described herein. Up and down motion of bar link 49 moves pull pin hook 47 between a relaxed, unlocked position 66 (FIG. 6) and a retracted, locked position 67 (FIG. 4) wherein the upturned hook 69 at the outer end of pull pin hook 47 has moved up, under door pull pin 46 and drawn door 12 tightly against its seal 32.

At its bottom edge, door 12 is drawn and held closed by the three, identical lock mechanisms 37-39. Lock mechanism 38 includes an adjustable door tensioner assembly 74 and an adjustable hook 75 that moves between a lowered unlocked position 76 (FIGS. 6 and 7) and a raised and retracted locking position 77 (FIG. 4). Tensioner assembly 74 includes a locking plate 80, a set screw 81 and a locking nut 82. Locking plate 80 is hingedly connected to door 12 at hinge 84 (FIG. 7) and initially lays flat against the lower frame member 83 of door 12. When adjustable hook 75 is pulled and angled upwardly, its hook tab 85, rigidly secured to the upturned hook end of hook 75, bears against locking plate 80 and pulls the bottom of door 12 inwardly, against seal 32. In the event adjustment is ever needed to draw door 12 or just one portion of door 12 in tighter (for example, if the seal 32 wears unevenly or door 12 becomes warped), locking nut 82 can be loosened, and set screw 81 tightened. That is, set screw 81 is threadedly advanced through a threaded hole in locking plate 80 until its forward, leading end bears against the lower frame member 83 of door 12, which pivots locking plate 80 about its hinge 84 and away from lower frame member 83. When hook 75 is pulled in (forwardly), it bears against a now more rearwardly extending locking plate 80, and door 12 is forced more tightly against its seal 32. Locking nut 82 is re-tightened after the adjustment is complete. Adjustable hook 75 is shaped as shown, and includes an arcuate camming bump 88, whereat hook 75 rides upon a bump pin 89. The combination of the camming bump 88 on bump pin 89 and the both curved and linear input to the forward end 90 of hook 75 provides an up and around lock engaging motion relative to tensioner assembly 74 that provides plenty of clearance for door 12 to open and close and provides a reliable and tight door locking action.

Referring to FIGS. 2 and 4-9, the apparatus 11 for remotely locking and unlocking the container door 12 generally includes actuator assembly 33 and locking assembly 95. Actuator assembly 33 includes a push assembly 96 and a driving mechanism 97 to move push assembly 96 between an extended position 98 (FIG. 6) and a retracted position 99 (FIG. 4). Push assembly 96 includes a pair of generally U-shaped, spaced apart push plates 103 and 104 that are connected together by a spanner plate 105 (FIG. 2) and a support beam 106 (FIG. 6), both extending therebetween. Each push plate has a front and rear upstanding push arm 107 and 108 (FIG. 5) configured to engage with a drive input rod (153 and 154) of the locking assembly 95. Front push arm 107 has a rearward engagement surface 110 that slants up and rearwardly about 5 degrees. Rear push arm 108 has a forward engagement surface 111 that slopes up and rearwardly about 5 degrees, but its top portion includes an initial locking engagement surface 112 with a forward angle of about 30 degrees. Alternative embodiments are contemplated wherein the rearward and forward engagement surface angles vary to between about 3 and 8 degrees rearwardly and the initial locking engagement surface angle varies between about 20 degrees and 40 degrees. The forward bending surface portion 112 is generally straight, as are the front and rear engagement surfaces 110 and 112, but alternative embodiments are contemplated wherein these surfaces have some degree of curvature. The initial locking engagement surface 112 fosters a smooth initial engagement with the main drive rods 153 and 154, as described, herein, since these rods 153 and 154 may be rotated via their connector links 155-158 to near a state pointing almost directly to the rear. In the embodiment shown in FIG. 7, with hook 75 in the lowered unlocked position 76, the radial line 159 from the pivot axis of links 155-158 (that is, of main drive shaft 142) to their main drive rods 153, 154 forms an angle of about 27 degrees below horizontal. In such configuration, with the force vector 160 of forward engagement surface 111 slanting up about 5 degrees, the horizontal movement of push plates 103 and 104, upon engagement with main drive rods 153 and 154, could bind up. The force vector 161 of forward sloping surface 112 is about 30 downward, which works to avoid such undesirable resistance by converting the initial force vector from about 5 degrees above horizontal to about 30 degrees below horizontal, as shown.

Driving mechanism 97 is a hydraulic cylinder 182 anchored at its forward end 183 to tipper frame 18, and its output rod 184 is mounted to the support beam 106 of push assembly 96. Appropriate guide structure and wear plates, as at 113 and 114 are provided to maintain push assembly 96 in its intended path.

Figure 8:
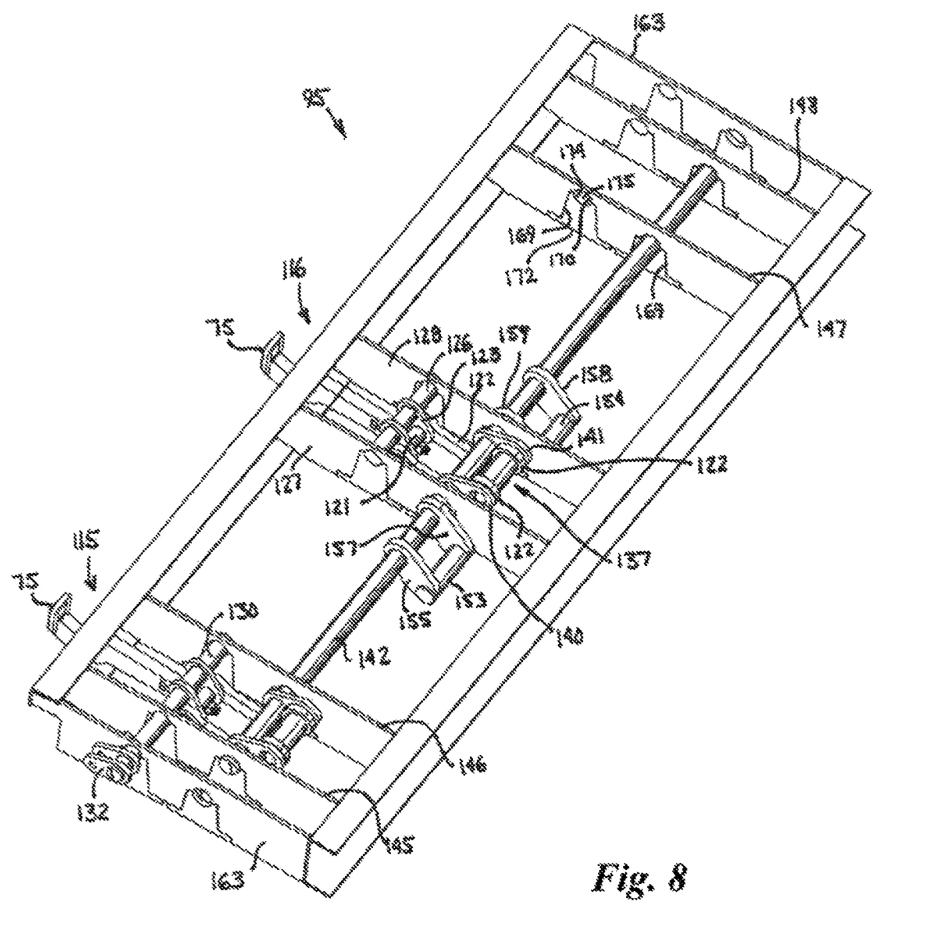
FIG. 8 is a perspective view of the locking assembly 95 of the container and vehicle 13 combination 10 of FIG. 1, and with one of the locking assembly sets 117 removed for clarity.
Figure 9:
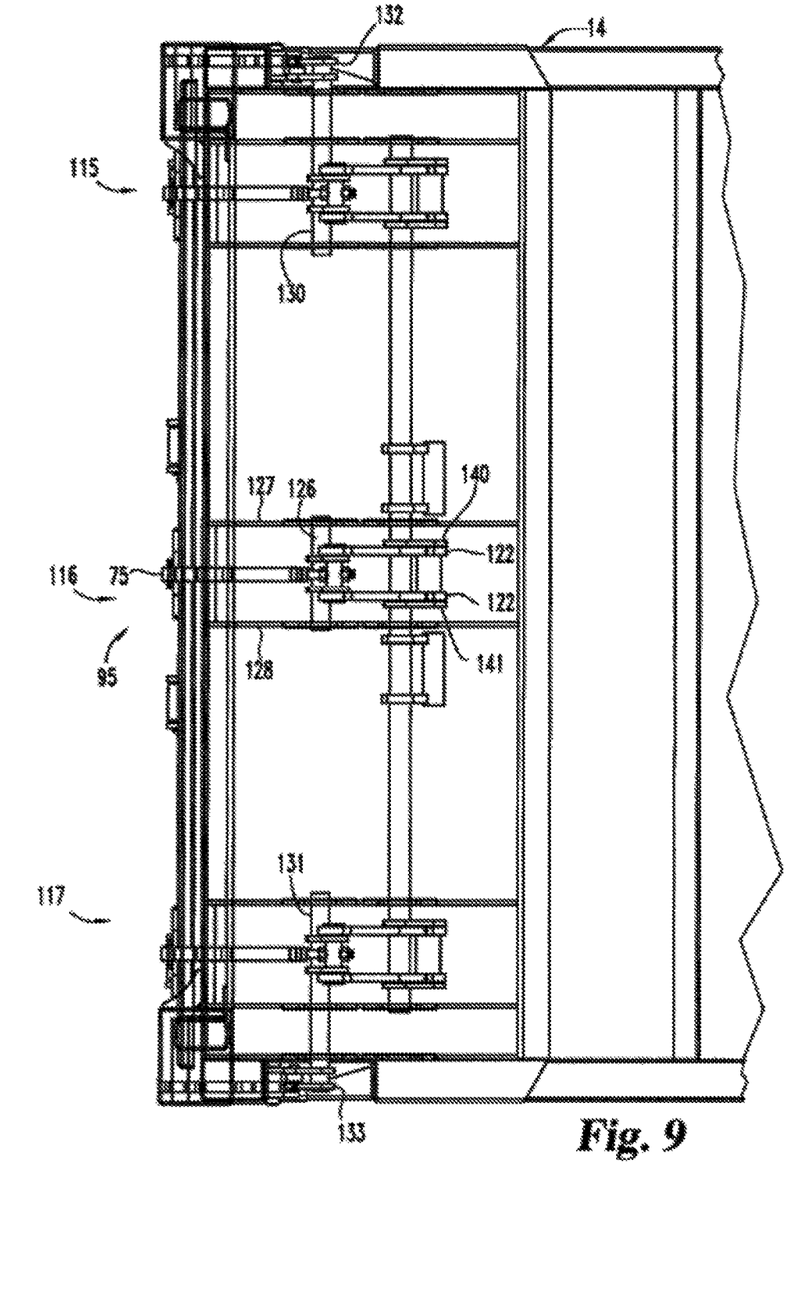
FIG. 9 is a bottom view of the container 14 of the container and vehicle combination 10 of FIG. 1.

Referring to FIGS. 4-9, and particularly 8 and 9, locking assembly 95 is contemplated to include one, two or more sets of components, each set configured and operable, upon engagement with actuator assembly 33, to move its adjustable hook 75 between its lowered unlocked position 76 (FIGS. 6 and 7) and its raised and retracted locking position 77 (FIG. 4). As shown in FIGS. 8 and 9, locking assembly 95 of the present invention has three hooks 75 and thus three, substantially identical locking assembly sets 115, 116 and 117. Locking assembly set 117 is removed from FIG. 8 for discussion of surrounding components. Because locking assembly sets 115, 116 and 117 are substantially identical, only set 116 will be described, with one notable difference discussed herein. Locking assembly set 116 includes its adjustable hook 75, the forward end of which is adjustably connected to a hook rod 121, which is rotatably journaled to both (1) one end of a pair of bent dogbone linkages 122 and (2) one end of a pair of upper links 123. The opposite ends of the upper links 123 are fixed to rotate with an upper locking rod 126, which is journaled for rotation by a pair of opposing lock assembly support plates 127 and 128, as described herein. This upper locking rod 126 generally serves no other function than to support the links and rods connected thereto. However, upper locking rods 130 and 131 of the other two locking assembly sets 115 and 117 on opposite sides thereof not only support the connected linkages, but they also extend outwardly therefrom and connect with corresponding links 132 and 133, respectively, which in turn connect with respective bar links 50 (FIG. 1) and 49 (FIG. 4) to lock/unlock side lock mechanisms 42 and 41.

At their forward ends, the pair of bent dogbone linkages 122 define aligned holes and are rigidly connected together by a sleeve 136 which, together, form a mounting collar 137 that is disposed between and journaled to and between one end of main drive links 140 and 141. The opposing ends of main drive links 140 and 141 are rigidly connect to and rotate as a unit with main drive shaft 142, which is supported for rotation by all the lock assembly support plates 127 and 128, 145 and 146, and 147 and 148. Outside of and on opposing sides of the central pair of lock assembly support plates 127 and 128, there are disposed main drive rods 153 and 154, each rigidly connected via a pair of connector links 155 and 156, and 157 and 158, respectively to main drive shaft 142, as shown.

Forward or rearward, generally linear input to main drive rods 153 and 154 (via rear and front upstanding push arms 108 and 107) causes main drive shaft 142 to rotate as a unit therewith and with main drive links 140 and 141, which moves bent dogbone links 122, which rotates upper links 123 and moves hook 75. The rotation of main drive shaft 142 likewise moves hooks 75 of locking assembly sets 115 and 117 and rotates upper locking rods 130 and 131, which moves link bars 50 and 49 via intermediate links 132 and 133.

The bend in dogbone link 122 causes collar 137 and its axis of rotation to move over center when push assembly 96 is moved to the locking position 99. The resistance to being locked tightly against its seal 32 causes door 12 to pull dogbone linkage 122 rearwardly, but because the axis of sleeve 136 of collar 137 is above a line extending between the axis of main drive shaft 142 and the axis of rotation at the opposite end of dogbone linkage 122 (that is, hook rod 121) the rearward pull on dogbone linkage 122 merely urges dogbone linkage 122 to rotate further counterclockwise about main drive shaft 142, that is further to the locked position. The linkages thus resist becoming unlocked without the significant input of actuator assembly 33.

A variety of part sizes, angles and manners of assembly and mounting may be used, but the current configuration is believed to be preferred.

Locking assembly 95 is supported by the three pairs of opposing lock assembly support plates 127 and 128, 145 and 146, and 147 and 148, as well as the outer lock assembly support plates 162 and 163, as shown in FIG. 8. All the lock assembly support plates 127, 128, 144-148, 162 and 163 are identical and are rigidly connected to rear and front bolsters 30 and 166, as shown. Referring to just one of the lock assembly support plates, plate 147 comprises a strong flat plate with two inverted, generally T-shaped notches 169 defined therein. At the base (top) of each notch is defined a semi-circular recess 170. A complementary-shaped, removable bearing T-plate 172 has defined at its base (top) a mirror image semi-circular recess 174 that, with recess 170 when T-plate 172 is positioned in a complementary notch 169, forms a bearing hole 175 for rotatably supporting a rotating rod such as main drive shaft 142 or an upper locking rod 126, 130 or 131. Each T-plate is stitch welded to its lock assembly support plate (i.e. 147) which fixedly connects T-plate and support plate together, but which enables the stitch welds to be removed by known methods, if desired, to service locking assembly 95. Assembly is also greatly facilitated as locking assembly 95 can be assembled upside down and the various linkages can be lowered into place, and the T-plates then stitch welded in place to provide a strong, secure and reliable locking assembly 95. The entire locking assembly 95 collection is then turned over, for example as shown in FIG. 8, and connected to or assembled with the rest of the container, the floor of the container typically being then welded directly thereon.

As assembled, when a container with locking assembly 95 is positioned atop a vehicle having actuator assembly 33, the main drive rods 153 and 154 are each thus juxtaposed directly between the front and rear upstanding push arms 107 and 108 of a push assembly 96. Actuation of actuator assembly 33 causes push assembly 96 to engage drive rods 153 and 154 and thus move locking hooks 75 and, if the container 14 is so equipped, side pull pin hooks 47 into and out of their locking positions.

Container and vehicle combination 10 is further provided with one or more auxiliary locks, such as Stinger locks 177 and 178, as is known.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system, comprising:
   a container having at least one open end;
   a door pivotably coupled to the container so that the door is movable between a first position, at which the door is spaced from the at least one open end, and a second position, at which the door closes the at least one open end; and
   a locking assembly coupled with the container, wherein the locking assembly comprises:
   a first shaft;
   a second shaft generally parallel with and spaced apart from the first shaft;
   at least one over center linkage extending between a respective first pivotal connection between the at least one over center linkage and the first shaft and a respective second pivotal connection between the at least one over center linkage and the second shaft; and
   at least one latch, the at least one latch coupled with the second shaft and movable between an unlatched position, wherein the at least one latch is spaced from the door, and a latched position, wherein the latch applies a closing force to the door;
   wherein the at least one over center linkage is movable, when the door is at the second position, over center to a state at which the latch is in the latched position and the door is biased toward the second position;
   wherein a first link arm extends between the first shaft and a first end of the at least one over center linkage and a second link arm extends between the second shaft and a second end of the at least one over center linkage.

2. The system of claim 1, further comprising a second over center linkage extending between a respective third pivotal connection between the second over center linkage and the first shaft and a respective fourth pivotal connection between the second over center linkage and the second shaft.

3. The system of claim 1, wherein the first link arm and the second link arm are respectively fixed for rotation with the first and second shafts.

4. The system of claim 1, wherein the at least one latch is adjustably connected to a rod that is rotatably journaled to the first link arm and the second link arm.

5. A system, comprising:
   a container having at least one open end;
   a door pivotably coupled to the container so that the door is movable between a first position, at which the door is spaced from the at least one open end, and a second position, at which the door closes the at least one open end; and
   a locking assembly coupled with the container, wherein the locking assembly comprises:
   a first shaft;
   a second shaft generally parallel with and spaced apart from the first shaft;
   at least one over center linkage extending between a respective first pivotal connection between the at least one over center linkage and the first shaft and a respective second pivotal connection between the at least one over center linkage and the second shaft; and
   at least one latch, the at least one latch coupled with the second shaft and movable between an unlatched position, wherein the at least one latch is spaced from the door, and a latched position, wherein the latch applies a closing force to the door;
   wherein the at least one over center linkage is movable, when the door is at the second position, over center to a state at which the latch is in the latched position and the door is biased toward the second position;
   wherein a first link arm extends between the first shaft and a first end of the at least one over center linkage and a second link arm extends between the second shaft and a second end of the at least one over center linkage;
   wherein the first pivotal connection is between the first link arm and the first end of the at least one over center linkage, and the second pivotal connection is between the second link arm and the second end of the at least one over center linkage.

6. The system of claim 1, wherein a locking plate is coupled with the door and the at least one latch is in engagement with the locking plate when the at least one latch is in the latched position.

7. The system of claim 1, wherein the movement of the at least one over center linkage is caused by rotation of the first shaft.

8. The system of claim 1, wherein the locking assembly comprises a plurality of latches.

9. A system, comprising:
a container having at least one open end;
a door coupled to the container so that the door is movable between a first position, at which the door is spaced from the at least one open end, and a second position, at which the door closes the at least one open end; and
a locking assembly coupled with the container, wherein the locking assembly comprises:
a first rotatable member;
a second rotatable member;
a linkage assembly coupled between the first rotatable member and the second rotatable member, wherein the linkage assembly has a first arm coupled to the first rotatable member, a second arm coupled to the second rotatable member, and a third arm coupled between the first and second arms at respective first and second pivot points; and
a latch coupled with the second rotatable member and movable between an unlatched position, wherein the at least one latch is spaced from the door, and a latched position, wherein the latch applies a closing force to the door;
wherein, when the door is in the second position, a line passes through the second pivot point and the coupling between the first arm and the first rotatable member;
wherein, when the first pivot point has rotated from a first side of the line to a second side of the line, the first pivot point is biased away from the first line, and the latch is in the latched position.

10. The system of claim 9, wherein the locking assembly comprises a frame comprising a plurality of generally parallel and spaced-apart support plates.

11. The system of claim 10, wherein the first and second rotatable members respectively extend between at least two of the support plates.

12. The system of claim 9, wherein rotation of the first rotatable member causes rotation of the first pivot point.

13. The system of claim 9, wherein the third arm comprises a bend between its respective connections with the first and second arms.

14. The system of claim 9, further comprising at least one side lock assembly pivotably coupled with the second rotatable member.

15. A system, comprising:
a container having at least one open end;
a door pivotably coupled to the container so that the door is movable between a first position, at which the door is spaced from the at least one open end, and a second position, at which the door closes the at least one open end; and
a locking assembly coupled with the container, wherein the locking assembly comprises:
a first member;
a second member;
a linkage assembly coupled between the first member and the second member, wherein the linkage assembly has a first end coupled to the first member, a second end coupled to the second member, and at least one pivot point intermediate the first and second ends of the linkage assembly; and
a latch coupled with the second member and movable between an unlatched position, wherein the at least one latch is spaced from the door, and a latched position, wherein the latch applies a closing force to the door;
wherein, when the at least one pivot point rotates to a point above the coupling of the linkage assembly first end and the first member, the door is in the second position, and wherein the door is released from the second position when the at least one pivot point is rotated below the coupling of the linkage assembly first end and the first member.

16. The system of claim 15, wherein the locking assembly is welded to a bottom side of the container.

17. The system of claim 15, wherein the at least one pivot point rotates in response to rotation of the first member.

18. The system of claim 15, further comprising a second pivot point intermediate the first and second ends of the linkage assembly.

19. The system of claim 15, further comprising an adjustable locking plate coupled with the door and which is in engagement with the latch when the latch is in the latched position.

* * * * *